(12) United States Patent
Edpalm et al.

(10) Patent No.: US 12,355,981 B2
(45) Date of Patent: Jul. 8, 2025

(54) IMAGE PROCESSING DEVICE AND A METHOD FOR ENCODING A VIEW AREA WITHIN AN IMAGE FRAME OF A VIDEO INTO AN ENCODED VIDEO AREA FRAME

(71) Applicant: Axis AB, Lund (SE)

(72) Inventors: Viktor Edpalm, Lund (SE); Song Yuan, Lund (SE); Toivo Henningsson, Lund (SE); Johan Palmaeus, Lund (SE)

(73) Assignee: Axis AB, Lund (SE)

( * ) Notice: Subject to any disclaimer, the term of this patent is extended or adjusted under 35 U.S.C. 154(b) by 127 days.

(21) Appl. No.: 17/980,156

(22) Filed: Nov. 3, 2022

(65) Prior Publication Data

US 2023/0171409 A1    Jun. 1, 2023

(30) Foreign Application Priority Data

Dec. 1, 2021   (EP) ..................................... 21211747

(51) Int. Cl.
*H04N 19/159*        (2014.01)
*G06T 7/11*          (2017.01)
(Continued)

(52) U.S. Cl.
CPC .............. *H04N 19/159* (2014.11); *G06T 7/11* (2017.01); *G06T 9/00* (2013.01); *G06V 10/25* (2022.01)

(58) Field of Classification Search
None
See application file for complete search history.

(56) References Cited

U.S. PATENT DOCUMENTS

| 10,432,970 B1 | 10/2019 | Phillips et al. |
| 2016/0014413 A1 | 1/2016 | Sato |

(Continued)

FOREIGN PATENT DOCUMENTS

| EP | 3220642 B1 | 3/2018 | |
| EP | 3346709 A1 * | 7/2018 | ........... H04N 19/119 |

OTHER PUBLICATIONS

Skupin et al., "Compressed domain processing for stereoscopic tile based panorama streaming using MV-HEVC," 2015 IEEE 5th International Conference on Consumer Electronics—Berlin (ICCE-Berlin), pp. 160-164 (2015).

(Continued)

*Primary Examiner* — Christopher G Findley
(74) *Attorney, Agent, or Firm* — Volpe Koenig

(57) ABSTRACT

A and method encode a view area within a current image frame of a video into an encoded video area frame. The view area is a respective subarea of each image frame, each image frame comprising first and second image portions, and between previous and current image frames, the view area moves across a boundary between the first and second image portions. First and second encoders are encode image data of the first and second image portions, respectively. First, second and third portions of the view area are identified based on their respective location in the previous and current image frames. Image data of the first and third portions are inter-coded as first and third encoded slices/tiles. Image data of the second portion of the view area in the current image frame are intra-coded as a second encoded slice/tile. The encoded slices/tiles are merged into the encoded video area frame.

11 Claims, 6 Drawing Sheets

(51) Int. Cl.
*G06T 9/00* (2006.01)
*G06V 10/25* (2022.01)

(56) References Cited

U.S. PATENT DOCUMENTS

2018/0338156 A1  11/2018  Morigami et al.
2019/0200029 A1   6/2019  Bangma et al.

OTHER PUBLICATIONS

Extended European Search Report dated May 4, 2022 for European Patent Application No. 21211747.7.

* cited by examiner

IMAGE PROCESSING DEVICE AND A METHOD FOR ENCODING A VIEW AREA WITHIN AN IMAGE FRAME OF A VIDEO INTO AN ENCODED VIDEO AREA FRAME

FIELD OF INVENTION

The present disclosure relates to image processing, and specifically to encoding a view area within an image frame of a video into an encoded video area frame.

TECHNICAL BACKGROUND

Over time image frames have become larger e.g., due to higher resolution. Other examples of large image frames are panoramic image frames constructed by stitching together image frames captured by multiple image sensors. When processing such large image frames of a video stream, such as encoding the image frames, each image frame may be divided into two or more image portions which are then processed in parallel in separate processing circuitries. Similarly, the encoded image frame may also be divided into corresponding two or more image portions on a decoder which are then processed in parallel in separate circuitries. In such solutions, it is generally desirable that the separate processing circuitries can process the respective image portions independently to as large an extent as possible and share as little image data as possible since such sharing requires synchronization between the processing circuitries which will slow down the processing. However, such independent handling of image portions causes problems in relation to encoding when a user only wants to view a limited view area of the image and that view area moves across a border between separate image portions between two consecutive images of the video stream.

SUMMARY

The present disclosure provides a method and an image processing device for encoding a view area within an image frame of a video into an encoded video area frame which overcome or mitigate issues in known methods and systems.

According to a first aspect, a method for encoding a view area within a current image frame of a video comprising a plurality of image frames into an encoded video area frame is provided. The view area is a respective subarea of each image frame of the plurality of image frames, and each image frame of the plurality of image frames comprises a first image portion and a second image portion. Between a previous image frame of the video and the current image frame of the video, the view area moves across a boundary between the first image portion and the second image portion. A first encoder arranged in a first processing circuitry is configured to encode image data of the first image portion of each image frame of the plurality of image frames and a second encoder arranged in a second processing circuitry is configured to encode image data of the second image portion of each image frame of the plurality of image frames. The method comprises identifying a first portion of the view area that is located in the first image portion in both the previous image frame and the current image frame, identifying a second portion of the view area that is located in the first image portion in the previous image frame and in the second image portion in the current image frame, and identifying a third portion of the view area that is located in the second image portion in both the previous and the current image frame. The method further comprises inter-coding, by the first encoder, image data of the first portion of the view area in the current image frame as a first encoded slice/tile by referring to reference image data corresponding to the previous image frame buffered in a first reference buffer arranged in the first processing circuitry, intra-coding, by the second encoder, image data of the second portion of the view area in the current image frame as a second encoded slice/tile, and inter-coding, by the second encoder, image data of the third portion of the view area in the current image frame as a third encoded slice/tile by referring to reference image data corresponding to the previous image frame buffered in a second reference buffer arranged in the second processing circuitry. The method further comprises merging the first encoded slice/tile, the second encoded slice/tile, and the third encoded slice/tile into the encoded view area frame.

It should be noted that in relation to scenarios in which inter-coding is used, a division of the view area into portions based on their location in relation to the first image portion and the second image portion in the current image frame and in the previous image frame, and relevant encoding into corresponding slices/tiles, problems with respect to encoding that would have otherwise occurred can be avoided and at the same time the cost in terms of bitrate after encoding can be limited. For example, the need for sharing image data between the processing circuitries can be reduced and hence the need for synchronization between the processing circuitries can be reduced.

By identification of the first, second and third portions, and encoding them into a respective slice/tile in the method according to the first aspect, only the second portion has to be intra-coded, and the first portion and the third portion may be inter-coded based on relevant reference image data buffered in the first reference buffer and second reference buffer, respectively. As referencing is thus only made to reference image data buffered in the respective buffer, transfer of reference image data between buffers can be avoided.

By a view area is generally meant a subarea of an image frame. A view area may for example be a portion of an image that is selected, e.g., by a user, for viewing such that only that portion of the image frame is shown. The view area may have the same form and size in all image frames of a video, but the form and/or size may also differ in the image frames of the video. The view area may further move such that a different portion is selected for viewing in different image frames. This is a way of digitally emulating a pan-tilt-zoom-view from a stationary overview.

By an encoded video area frame is meant an encoded view area of an image frame, i.e., an encoded video area frame is a frame encoded by encoding only the portion of the image frame included in the view area.

By slice/tile is meant slice or tile. A combination is also possible.

In the act of inter-coding, by the first encoder, the image data of the first portion of the view area in the current image frame may be inter-coded as the first encoded slice/tile by referring to reference image data corresponding to the first portion of the view area in the previous image frame buffered in the first reference buffer. Furthermore, in the act of inter-coding, by the second encoder, the image data of the third portion of the view area in the current image frame may be inter-coded as the third encoded slice/tile by referring to reference image data corresponding to the third portion of the view area in the previous image frame buffered in the second reference buffer.

In the act of inter-coding, by the first encoder, the image data of the first portion of the view area in the current image frame may be inter-coded as the first encoded slice/tile by referring to reference image data corresponding to the view area in the previous image frame buffered in the first reference buffer. Furthermore, in the act of inter-coding, by the second encoder, the image data of the third portion of the view area in the current image frame may be inter-coded as the third encoded slice/tile by referring to reference image data corresponding to the view area in the previous image frame buffered in the second reference buffer.

The method according to the first aspect may further comprise inter-coding dummy image data of a ghost portion of the view area as a ghost encoded slice/tile by referring to reference image data corresponding the view area in the previous image frame buffered in the first reference buffer. The ghost portion should be configured to have a shape such that the combination of the first portion and the ghost portion of the current image frame has the same shape as the reference image data in the first reference buffer.

By a ghost portion is meant an extra portion created using dummy image data only to encode a ghost slice/tile.

By dummy image data is meant arbitrary image data that are used to create a ghost portion.

By a ghost slice/tile is meant a slice/tile that is not merged into the encoded view area frame but is only encoded in order to enable an encoder to refer to all reference data corresponding to the view area in in the previous image frame buffered in the first reference buffer.

The first image portion may be captured by a first image sensor and wherein the second image portion may be captured by a second image sensor. In alternative, both the first image portion and the second image portion may be captured by a single image sensor.

According to a second aspect, an encoding device including a non-transitory computer-readable storage medium is provided having stored thereon instructions for implementing the method according to the first aspect when executed by a device having processing capabilities.

According to a third aspect, an image processing device for encoding a view area within a current image frame of a video comprising a plurality of image frames into an encoded video area frame is provided. The view area is a respective subarea of each image frame of the plurality of image frames, and each image frame of the plurality of image frames comprises a first image portion and a second image portion. Between a previous image frame of the video and the current image frame of the video, the view area moves across a boundary between the first image portion and the second image portion. The device comprises a first processing circuitry, and a second processing circuitry. The device further comprises a first encoder arranged in the first processing circuitry configured to encode image data of the first image portion of each image frame of the plurality of image frames, a second encoder arranged in the second processing circuitry configured to encode image data of the second image portion of each image frame of the plurality of image frames, a first reference buffer arranged in the first circuitry, and a second reference buffer arranged in the second circuitry. The device further comprises a device circuitry configured to execute a first identifying function configured to identify a first portion of the view area that is located in the first image portion in both the previous image frame and the current image frame, a second identifying function configured to identify a second portion of the view area that is located in the first image portion in the previous image frame and in the second image portion in the current image frame, and a third identifying function configured to identify a third portion of the view area that is located in the second image portion in both the previous and the current image frame. The device circuitry is further configured to execute a first inter-coding instructing function configured to instruct the first encoder to inter-code image data of the first portion of the view area in the current image frame as a first encoded slice/tile by referring to reference image data corresponding to the previous image frame buffered in the first reference buffer, an intra-coding instructing function configured to instruct the second encoder to intra-code image data of the second portion of the view area in the current image frame as a second encoded slice/tile, and a second inter-coding instructing function configured to instruct the second encoder to inter-code image data of the third portion of the view area in the current image frame as a third encoded slice/tile by referring to reference image data corresponding to the previous image frame buffered in the second reference buffer. The device circuitry is further configured to execute a merging function configured to merge the first encoded slice/tile, the second encoded slice/tile, and the third encoded slice/tile into the encoded view area frame.

The above-mentioned optional features of the method according to the first aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF DRAWINGS

The above and other aspects of the present disclosure will now be described in more detail, with reference to appended figures. The figures should not be considered limiting but are instead used for explaining and understanding. Like reference numerals refer to like elements throughout.

DETAILED DESCRIPTION

Figure 1:
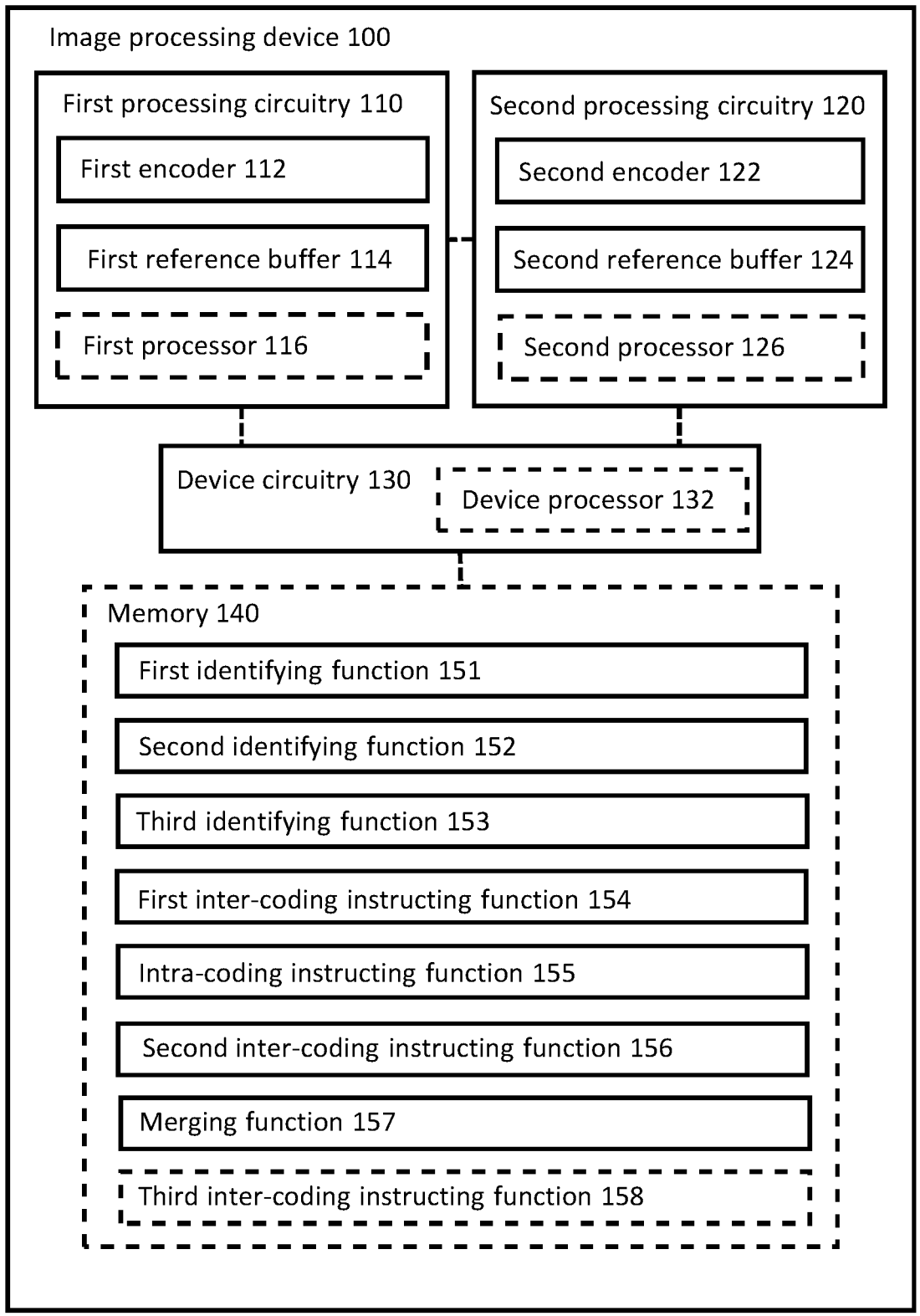
FIG. 1 is a schematic block diagram of an image processing device for encoding a view area within a current image frame of a video comprising a plurality of image frames into an encoded video area frame according to the present disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Rather, these embodiments are provided for thoroughness and completeness, and to convey the scope of the disclosure to the skilled person.

In the following an image processing device 100 for encoding a view area within a current image frame of a video comprising a plurality of image frames into an encoded video area frame according to the present disclosure will be discussed with reference to FIG. 1. The image processing device 100 is intended to be used in a scenario wherein each image frame of the plurality of image frames comprises at least a first image portion and a second image portion, in order to enable parallel processing of the first image portion and the second image portion in separate processing circuitries. The division of each image frames into the first image portion and the second image portion is typically the same over time, at least over a group of pictures (GOP). The view area is a respective subarea of each image frame of the plurality of image frames, and between a previous image frame of the video and the current image frame of the video, the view area moves across a boundary between the first image portion and the second image portion. To this end, the image processing device 100 comprises a first processing circuitry 110 and a second processing circuitry 120. The first processing circuitry comprises a first encoder 112 and a first reference buffer 114. The first encoder 112 is configured to encode image data of a first image portion of each image frame of a video and the reference buffer 114 is configured to store reference image data in relation to the first image portion. The first encoder 112 is further configured to produce reference image data in relation to the first image portion of each image frame by decoding the encoded image data of the first image portion of the image frame and store it in the first reference buffer 114. The reference image data in the first reference buffer 114 used for a current image frame hence corresponds to a previous image frame and is a decoded version of encoded image data of the first image portion of the previous image frame. The second processing circuitry comprises a second encoder 122 and a second reference buffer 124. Correspondingly, the second encoder 122 is configured to encode image data of a second image portion of each image frame of the video and the reference buffer 124 is configured to store reference image data in relation to the second image portion. The second encoder 122 is further configured to produce reference image data in relation to the second image portion of each image frame by decoding the encoded image data of the second image portion of the image frame and store it in the second reference buffer 124. The reference image data in the first reference buffer 124 used for a current image frame hence corresponds to a previous image frame and is a decoded version of encoded image data of the first image portion of the previous image frame. The first and second processing circuitries 110, 120 may each include a first and second processor 116, 126, respectively, such as a central processing unit (CPU), microcontroller, or microprocessor.

For scenarios where each image frame of a video is divided into more than two image portions, the image processing device 100 of the present disclosure may comprise a separate processing circuitry comprising a respective encoder and reference buffer for each image portion, such as four processing circuitries if there are four image portions.

The image processing device 100 further comprises a device circuitry 130. The device circuitry 130 is configured to carry out functions of the image processing device 100. The device circuitry 130 may include a device processor 122, such as a central processing unit (CPU), microcontroller, or microprocessor. The device processor 132 is configured to execute program code. The program code may for example be configured to carry out functions of the image processing device 100.

The image processing device 100 may further comprise a memory 140. The memory 140 may be one or more of a buffer, a flash memory, a hard drive, a removable media, a volatile memory, a non-volatile memory, a random access memory (RAM), or another suitable device. In an example arrangement, the memory 130 includes a non-volatile memory for long term data storage and a volatile memory that functions as system memory for the device circuitry 130. The memory 140 may exchange data with the device circuitry 130 over a data bus. Accompanying control lines and an address bus between the memory 140 and the device circuitry 130 may also be present. Data may be exchanged between the first processing circuitry 110 and the second processing circuitry 120 over a data bus.

Functions of the image processing device 100 may be embodied in the form of executable logic routines (e.g., lines of code, software programs, etc.) that are stored on a non-transitory computer readable medium (e.g., the memory 140) of the image processing device 100 and are executed by the device circuitry 130 (e.g., using the device processor 132). Furthermore, the functions of the image processing device 100 may be a stand-alone software application or form a part of a software application that carries out additional tasks related to the image processing device 100. The described functions may be considered a method that a processing unit, e.g., the device processor 132, of the device circuitry 130 is configured to carry out. Also, while the described functions may be implemented in software, such functionality may as well be carried out via dedicated hardware or firmware, or some combination of hardware, firmware and/or software.

As the image processing device 100 is intended to be used in a scenario wherein the first image portion and the second image portion in parallel in the first processing circuitry 110 and the second processing circuitry 120, it is desirable, although not required, that as little image data as possible is shared between the two processing circuitries 110, 120 since such sharing requires synchronization between the two processing circuitries which will slow down the processing. Hence, when inter-coding image data in one of the two processing circuitries 110, 120, such inter-coding should only refer to reference data stored in the buffer corresponding to the image portion to which the image data relate. To this end, the device circuitry 130 is configured to execute identifying functions to identify portions of the view area depending on their location in either of the first image portion and the second image portion in the previous image frame and the current image frame, respectively.

Specifically, the device circuitry 130 is configured to execute a first identifying function 151 configured to identify a first portion of the view area that is located in the first image portion in both the previous image frame and the current image frame.

The device circuitry 130 is further configured to execute a second identifying function 152 configured to identify a second portion of the view area that is located in the first image portion in the previous image frame and in the second image portion in the current image frame.

The device circuitry 130 is further configured to execute a third identifying function 153 configured to identify a third portion of the view area that is located in the second image portion in both the previous and the current image frame.

Since the first portion is located in the first image portion in the current image frame, the first portion should be encoded by the first encoder 112 in the first processing circuitry 110. Furthermore, since the first portion is located in the first image portion also in the previous image frame, reference image data corresponding to the first portion in the previous image frame is buffered in the first reference buffer 114 in the first processing circuitry 110. Hence, the device circuitry 130 is further configured to execute a first inter-coding instructing function 154 configured to instruct the first encoder 112 to inter-code image data of the first portion of the view area in the current image frame as a first encoded slice/tile by referring to reference image data corresponding to the previous image frame buffered in the first reference buffer 114.

Since the second portion is located in the second image portion in the current image frame, the second portion should be encoded by the second encoder 122 in the second processing circuitry 120. However, since the second portion is located in the first image portion in the previous image frame, reference image data corresponding to the second portion in the previous image frame is buffered in the first reference buffer 114 in the first processing circuitry 110. Hence, the device circuitry 130 is further configured to execute an intra-coding instructing function 155 configured to instruct the second encoder 122 to intra-code image data of the second portion of the view area in the current image frame as a second encoded slice/tile.

Since the third portion is located in the second image portion in the current image frame, the third portion should be encoded by the second encoder 122 in the second processing circuitry 120. Furthermore, since the third portion is located in the second image portion also in the previous image frame, reference image data corresponding to the third portion in the previous image frame is buffered in the second reference buffer 124 in the second processing circuitry 120. Hence, the device circuitry 130 is further configured to execute a second inter-coding instructing function 156 configured to instruct the second encoder 122 to inter-code image data of the third portion of the view area in the current image frame as a third encoded slice/tile by referring to reference image data corresponding to the previous image frame buffered in the second reference buffer 124.

By identification of the first, second and third portions and encoding them into a respective slice/tile, only the second portion has to be intra-coded, and the first portion and the third portion may be inter-coded based on relevant reference image data buffered in the first reference buffer and second reference buffer, respectively. As referencing is thus only made to reference image data buffered in the respective buffer, transfer of reference image data between buffers can be avoided.

The device circuitry 130 is further configured to execute a merging function 157 configured to merge the first encoded slice/tile, the second encoded slice/tile, and the third encoded slice/tile into the encoded view area frame.

The first inter-coding instructing function 151 may be configured to instruct the first encoder 112 to inter encode the image data of the first portion of the view area in the current image frame as the first encoded slice/tile by specifically referring to reference image data corresponding to the first portion of the view area in the previous image frame buffered in the first reference buffer 114. The second inter-coding instructing function 152 may be configured to instruct the second encoder 122 to inter-code the image data of the third portion of the view area in the current image frame as the third encoded slice/tile by specifically referring to reference image data corresponding to the third portion of the view area in the previous image frame buffered in the second reference buffer 124.

However, as inter-coding may become more effective in terms of the resulting bitrate after encoding if more relevant reference image data can be used, the first inter-coding instructing function 151 may be configured to instruct the first encoder 112 to inter-code the image data of the first portion of the view area in the current image frame as the first encoded slice/tile by referring to reference image data corresponding to the view area in the previous image frame buffered in the first reference buffer 114. For a scenario where the view area moves across the border between the first image portion and the second image portion such that all portions of the view area is either in the first image portion or in the second image portion in both the current image frame and the previous image frame, this means that the first encoder 112 may refer to reference image data corresponding to both the first portion and the second portion of the view area in the previous image frame stored in the first buffer 114 when inter-coding the first portion as the first slice/tile. This is described further in the description below with reference to FIGS. 3A-C and 4A-C. Generally, for all scenarios where the view area moves across borders between two or more image portions, such as between four image portions using an image processing device 100 comprising a respective processing circuitry for each image portion, this means that the first encoder 112 may refer to reference image data corresponding to all portions of the view area included in the first image portion in the previous image frame and stored in the first buffer 114 when inter-coding the first portion as the first slice/tile. This is described further in the description below with reference to FIGS. 5A-F. The second inter-coding instructing function 152 may be configured to instruct the second encoder 122 to inter-code the image data of the third portion of the view area in the current image frame as the third encoded slice/tile by referring to reference image data corresponding to the view area in the previous image frame buffered in the second reference buffer 124. For a scenario where the view area moves across the border between the first image portion and the second image portion such that all portions of the view area are either in the first image portion or in the second image portion in both the current image frame and the previous image frame, this means that the second encoder 122 may refer to reference image data corresponding to the third portion of the view area in the previous image frame stored in the second buffer 124 when inter-coding the third portion as the third slice/tile. This is described further in the description below with reference to FIGS. 3A-C and 4A-C. Generally, for all scenarios where view area moves across borders between two or more image portions, such as between four image portions using an image processing device 100 comprising a respective processing circuitry for each image portion, this means that the second encoder 122 may refer to reference image data corresponding to all portions of the view area included in the second image portion in the previous image frame and stored in the first buffer 114 when inter-coding the third portion as the third slice/tile. This is described further in the description below with reference to FIGS. 5A-F.

The device circuitry 130 may be further configured to execute a third inter-coding instructing function 158 configured instruct the first encoder 112 to inter-code dummy image data of a ghost portion of the view area as a ghost encoded slice/tile by referring to reference image data corresponding to the view area in the previous image frame buffered in the first reference buffer 114. Such inter-coding of dummy image data of a ghost portion as a ghost slice/tile need only be performed if the first encoder 112 is only allowed to refer to image reference data of corresponding portions in the current and previous image frame, e.g., if the first encoder 112 is only allowed to refer to image reference data corresponding to the first portion of the view area of the previous image frame when inter-coding the first portion. In such a case, a ghost portion is created including dummy image data. This ghost portion is an extra portion which is only used to enable an encoder to refer to all reference data corresponding to the view area in the previous image frame buffered in the first reference buffer. The dummy image data can be arbitrarily generated image data. The encoded ghost slice/tile is not merged into the encoded view area frame but is only encoded in order to enable an encoder to refer to all reference data corresponding to the view area in the previous image frame buffered in the first reference buffer. For a scenario where the view area moves across the border between the first image portion and the second image portion such that all portions of the view area is either in the first image portion or in the second image portion in both the current image frame and the previous image frame, this means that the ghost portion should be configured to have the same shape as the second portion of the view area in the previous image frame such that the combination of the first portion and the ghost portion of the current image frame is the same as the shape of the first portion and the second portion of the previous image frame. This is described further in the description below with reference to FIGS. 3A-C and 4A-C. Generally, for all scenarios where view area moves across borders between two or more image portions, such as between four image portions using an image processing device 100 comprising a respective processing circuitry for each image portion, this means that the ghost frame should be configured to have a shape such that the combination of the first portion in the current image frame and the ghost portion has the same shape as all portions of the view area located in the first image portion in the previous image frame. This is described further in the description below with reference to FIGS. 5A-F.

Each image frame of the plurality of image frames comprising the first image portion and the second image portion may be captured by a single image sensor (not shown) comprised in the image processing device 100. In alternative, the image processing device 100 may comprise a first image sensor (not shown) for capturing the first image portion and a second image sensor (not shown) for capturing the second image portion.

In the following a method 200 for encoding a view area within a current image frame of a video comprising a plurality of image frames into an encoded video area frame according to the present disclosure will be discussed with reference to FIG. 2. The view area is a respective subarea of each image frame of the plurality of image frames, and each image frame of the plurality of image frames comprises a first image portion and a second image portion. Between a previous image frame of the video and the current image frame of the video, the view area moves across a boundary between the first image portion and the second image portion. A first encoder arranged in a first processing circuitry is configured to encode image data of the first image portion of each image frame of the plurality of image frames and a second encoder arranged in a second processing circuitry is configured to encode image data of the second image portion of each image frame of the plurality of image frames. The steps of the method 200 may be performed by the image processing device 100 described above with reference to FIG. 1.

The method 200 comprises identifying S210 a first portion of the view area that is located in the first image portion in both the previous image frame and the current image frame, identifying S220 a second portion of the view area that is located in the first image portion in the previous image frame and in the second image portion in the current image frame, and identifying S230 a third portion of the view area that is located in the second image portion in both the previous image frame and the current image frame. The method 200 further comprises inter-coding S240, by the first encoder, image data of the first portion of the view area in the current image frame as a first encoded slice/tile by referring to reference image data corresponding to the previous image frame buffered in a first reference buffer arranged in the first processing circuitry. The method 200 further comprises intra-coding S250, by the second encoder, image data of the second portion of the view area in the current image frame as a second encoded slice/tile. The method 200 further comprises inter-coding S260, by the second encoder, image data of the third portion of the view area in the current image frame as a third encoded slice/tile by referring to reference image data corresponding to the previous image frame buffered in a second reference buffer arranged in the second processing circuitry. The method further comprises merging S270 the first encoded slice/tile, the second encoded slice/tile, and the third encoded slice/tile into the encoded video area frame.

The method 200 may further comprise inter-coding S245, by the first encoder, dummy image data of a ghost portion of the view area as a ghost encoded slice/tile by referring to reference image data corresponding the view area in the previous image frame buffered in the first reference buffer.

Figure 2:
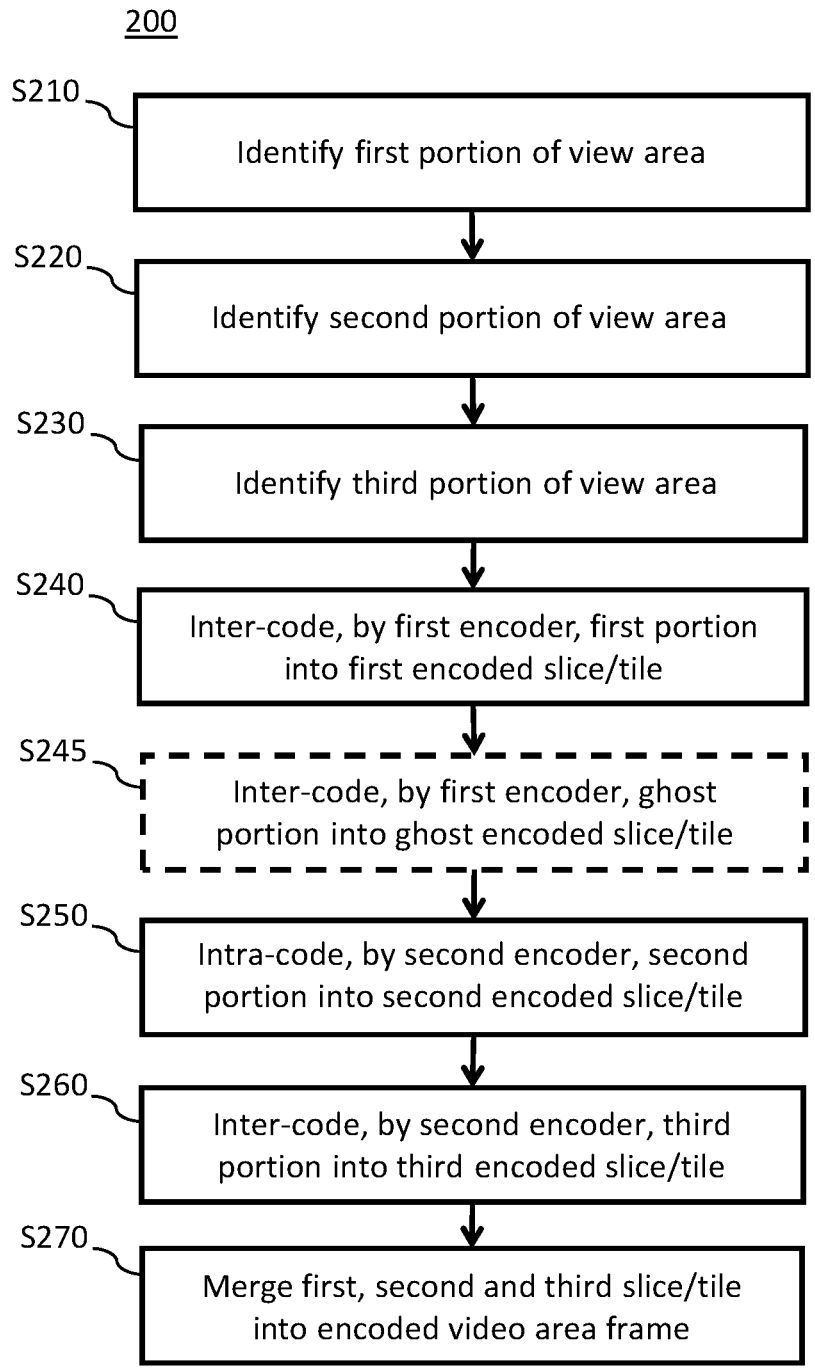
FIG. 2 is a flow chart of a method for encoding a view area within a current image frame of a video comprising a plurality of image frames into an encoded video area frame according to the present disclosure.

The method 200 and its included steps may be further adapted as the image processing device 100 and its included functions as described in relation to FIG. 1.

In the following three examples will be described in relation to FIGS. 3A-C and FIG. 4A-C, wherein a view area moves across a border between two image portions between a first (previous) image frame and a second (current) image frame, and FIGS. 5A-F wherein a view area moves across borders between four image portions between two image frames. It is to be noted that the absolute and relative sizes of the image frames, image portions and view areas have been selected for illustrational purposes only and hence does not necessarily reflect any real scenario.

Figure 3A:
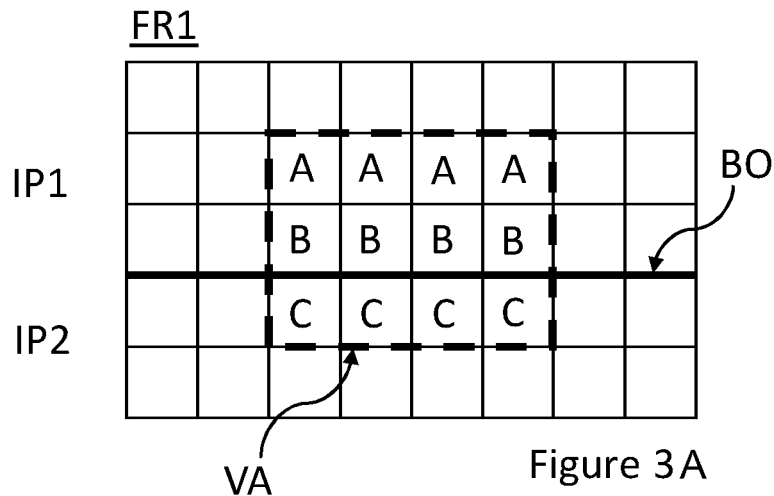
FIGS. 3A-3C show a first example in relation to vertical movement downward of a view area across a horizontal border between a first image portion and a second image portion between a previous image frame and a current image frame.
Figure 3B:
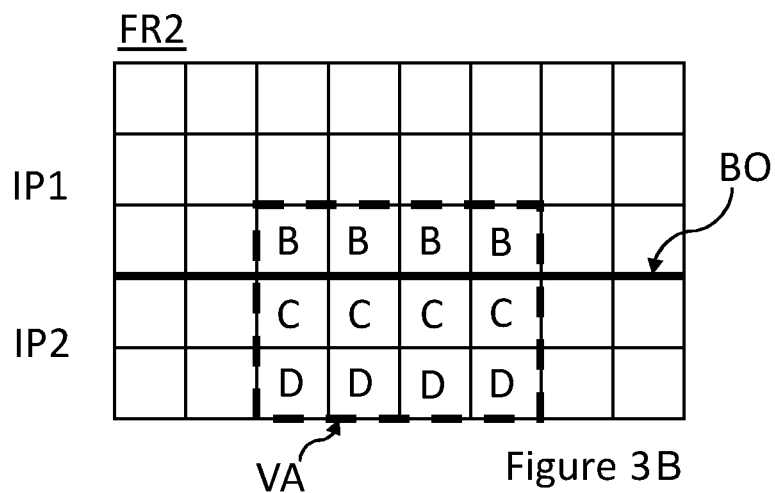
Figure 3C:
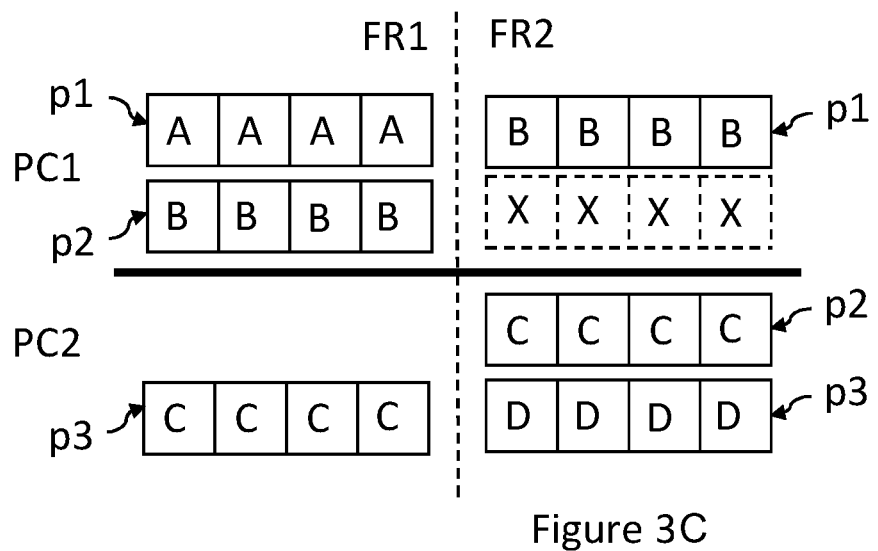

Reference is now made to FIGS. 3A-C which show a first example in relation to vertical movement downward of a view area VA across a horizontal border BO between a first image portion IP1 and a second image portion IP2 between a previous (first) image frame FR1 and a current (second) image frame FR2 of a plurality of image frames of a video to be encoded. Each image frame FR1, FR2 is illustrated as a grid of pixel blocks which is five pixel blocks high and seven pixel blocks wide. The view area VA is three pixel blocks high and four pixel blocks wide and highlighted with a dashed rectangle. In the first example, the method 200 of the present disclosure is performed in an image processing device, such as the image processing device 100 of the present disclosure. The image processing device comprises a first processing circuitry PC1 and a second processing circuitry PC2 configured to process the first image portion IP1 and the second image portion IP2, respectively. The processing is typically performed in parallel and with as little exchange of image data as possible between the two circuitries PC1, PC2. A first encoder is arranged in the first processing circuitry PC1 and is configured to encode image data of the first image portion IP1 of each image frame of the plurality of image frames, such as the previous image frame FR1 and the current image frame FR2. Correspondingly, a second encoder is arranged in the second processing circuitry PC2 configured to encode image data of the second image portion IP2 of each image frame of the plurality of image frames, such as the previous image frame FR1 and the current image frame FR2. Furthermore, a first reference buffer is arranged in the first processing circuitry PC1, and a second reference buffer is arranged in the second processing circuitry PC2. The first reference buffer is configured to buffer reference image data in relation to the first image portion IP1, and the second reference buffer is configured to buffer reference image data in relation to the second image portion IP2.

In the method 200, the view area VA of the current image frame FR2 is to be encoded into an encoded video area frame. First, separate portions of the view area VA are identified based on their location in the previous image frame FR1 and the current image frame FR2. Specifically, a first portion p1 of the view area VA is identified that is located in the first image portion IP1 in both the previous image frame FR1 and the current image frame FR2. This first portion p1 is the portion of four pixel blocks identified by the letter 'A' within the view area VA in the previous image frame FR1 as illustrated in FIGS. 3A and 3C and is the portion of four pixel blocks identified by the letter 'B' within the view area VA in the current image frame FR2 as illustrated in FIGS. 3B and 3C. Furthermore, a second portion p2 of the view area VA is identified that is located in the first image portion IP1 in the previous image frame FR1 and in the second image portion IP2 in the current image frame FR2. This second portion p2 is the portion of four pixel blocks identified by the letter 'B' within the view area VA in the previous image frame FR1 as illustrated in FIGS. 3A and 3C and is the portion of four pixel blocks identified by the letter 'C' within the view area VA in the current image frame FR2 as illustrated in FIGS. 3B and 3C. Furthermore, a third portion p3 of the view area VA is identified that is located in the second image portion IP2 in both the previous image frame FR1 and in the current image frame FR2. This third portion p3 is the portion of four pixel blocks identified by the letter 'C' within the view area VA in the previous image frame FR1 as illustrated in FIGS. 3A and 3C and is the portion of four pixel blocks identified by the letter 'D' within the view area VA in the current image frame FR2 as illustrated in FIGS. 3B and 3C. Once the different portions have been identified, the pixel blocks of the portions in the current image frame FR2 can be encoded into respective slices.

As the first portion p1 of the view area VA is located in the first image portion IP1 in both the previous image frame FR1 and the current image frame FR2, the first encoder arranged in the first processing circuitry PC1 will be used for encoding the first portion p1 of the current image frame FR2, and also, the first reference buffer arranged in the first processing circuitry PC1 will buffer reference image data corresponding to the first portion p1 of the view area VA in the previous image frame FR1. Hence, image data of the first portion p1 of the view area VA in the current image frame FR2 may be inter-coded by the first encoder arranged in the first processing circuitry PC1 as a first encoded slice by referring to reference image data corresponding to the first portion p1 of the view area VA in the previous image frame FR1, which reference image data are buffered in the first reference buffer arranged in the first processing circuitry PC1.

However, as illustrated in FIGS. 3A and 3C, the first image portion IP1 includes both the first portion p1 and the second portion p2 of the view area VA in the previous image frame FR1. Hence, the first reference buffer arranged in the first processing circuitry PC1 will buffer reference image data corresponding to both the first portion p1 and the second portion p2 of the view area VA in the previous image frame FR1. Hence, image data of the first portion p1 of the view area VA in the current image frame FR2 may be inter-coded by the first encoder arranged in the first processing circuitry PC1 as the first encoded slice by referring to reference image data corresponding to both the first portion p1 and the second portion p2 of the view area VA in the previous image frame FR1, i.e., all portions of the view area VA located in the first image portion IP1 in the previous image frame FR1. In order to allow reference to reference image data corresponding to all portions of the view area VA located in the first image portion IP1 in the previous image frame FR1 when inter-coding the first portion p1 of the view area VA in the current image frame FR2, the pixel area to be inter-coding may in some scenarios have to be extended with a ghost portion such that the combination of the first portion of the view area VA in the current image frame FR2 has the same shape as the combination of all portions of the view area VA located in the first image portion IP1 in the previous image frame FR1. Such a ghost portion is illustrated in FIG. 3C by four image blocks having dashed lines and identified by the letter 'X'. In such a case, a ghost portion is created including dummy image data. This ghost portion is an extra portion which is not a real portion of the view area VA in the current frame FR2 but is only used to enable the first encoder to refer to all reference data corresponding to the view area VA in the previous image frame FR1 and buffered in the first reference buffer arranged in the first processing circuitry PC1. The dummy image data can be arbitrarily generated image data. The encoded ghost slice is not merged into the encoded video area frame. As indicated in relation to the description of the image processing device 100 with reference to FIG. 1, for this first example, where the view area VA moves across the border BO between the first image portion IP1 and the second image portion IP2 such that all portions of the view area VA is either in the first image portion IP1 or in the second image portion IP2 in both the current image frame and the previous image frame, the ghost portion should be configured to have the same shape as the second portion of the view area VA in the previous image frame such that the combination of the first portion p1 and the ghost portion of the current image frame FR2 is the same as the shape of the first portion p1 and the second portion p2 of the previous image frame FR1. The dummy image data of the ghost portion of the view area VA are inter-coded as a ghost encoded slice by referring to reference image data corresponding to both the first portion p1 and the second portion p2 of the view area VA in the previous image frame FR1 buffered in the first reference buffer arranged in the first processing circuitry PC1, i.e., all portions of the view area VA in the first image portion IP1 in the previous image frame FR1.

As the second portion p2 of the view area VA is located in the first image portion IP1 in the previous image frame FR1 and in the second image portion IP2 in the current image frame FR2, the second encoder arranged in the second processing circuitry PC2 will be used for encoding the second portion p2 of the current image frame FR2, but the first reference buffer arranged in the first processing circuitry PC1 will buffer reference image data corresponding to the second portion p2 of the view area VA in the previous image frame FR1. Hence, image data of the second portion p2 of the view area VA in the current image frame FR2 need to be intra-coded, by the second encoder arranged in the second processing circuitry PC2, as a second encoded slice (see FIG. 3c).

As the third portion p3 of the view area VA is located in the second image portion IP2 in both the previous image frame FR1 and the current image frame FR2, the second encoder arranged in the second processing circuitry PC2 will be used for encoding the third portion p3 of the current image frame FR2, and also, the second reference buffer arranged in the second processing circuitry PC2 will buffer reference image data corresponding to the third portion p3 of the view area VA in the previous image frame FR1. Hence, image data of the third portion p3 of the view area VA in the current image frame FR2 may be inter-coded by the second encoder arranged in the second processing circuitry PC2 as a third encoded slice by referring to reference image data corresponding to the third portion p3 of the view area VA in the previous image frame FR1, which reference image data are buffered in the second reference buffer arranged in the second processing circuitry PC2 (see FIG. 3c).

The first encoded slice, the second encoded slice, and the third encoded slice are then merged into the encoded video area frame. The first encoder will then decode the encoded image data of the first image portion IP1 of the current image frame FR2 and store it as reference image data in the first reference buffer. Correspondingly, the second encoder will decode the encoded image data of the second image portion IP2 of the current image frame FR2 and store it as reference image data in the second reference buffer. The reference image data in the first reference buffer and in the second reference buffer corresponding to the current frame FR2 will then be used as reference image data for a subsequent frame (not shown).

Figure 4A:
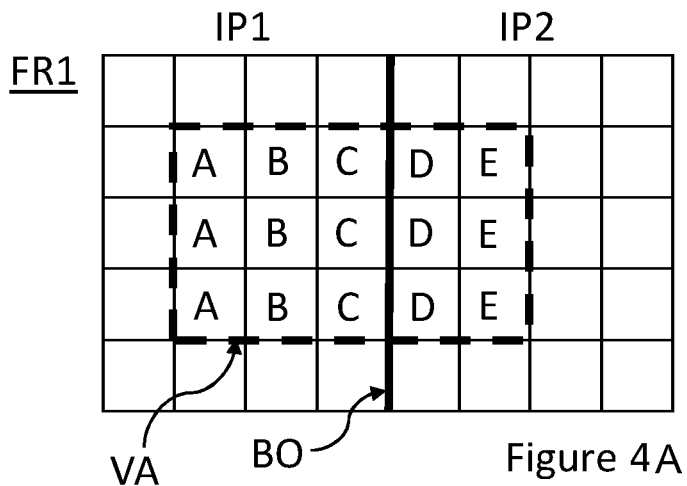
FIGS. 4A-4C show a second example in relation to horizontal movement to the right of a view area across a vertical border between a first image portion and a second image portion between a previous image frame and a current image frame.
Figure 4B:
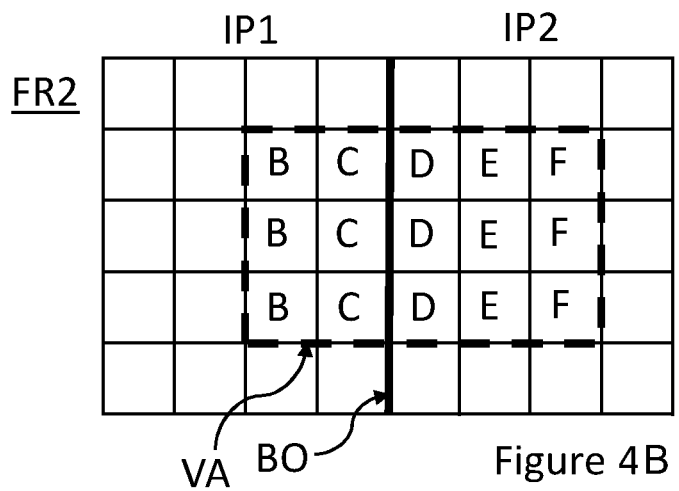
Figure 4C:
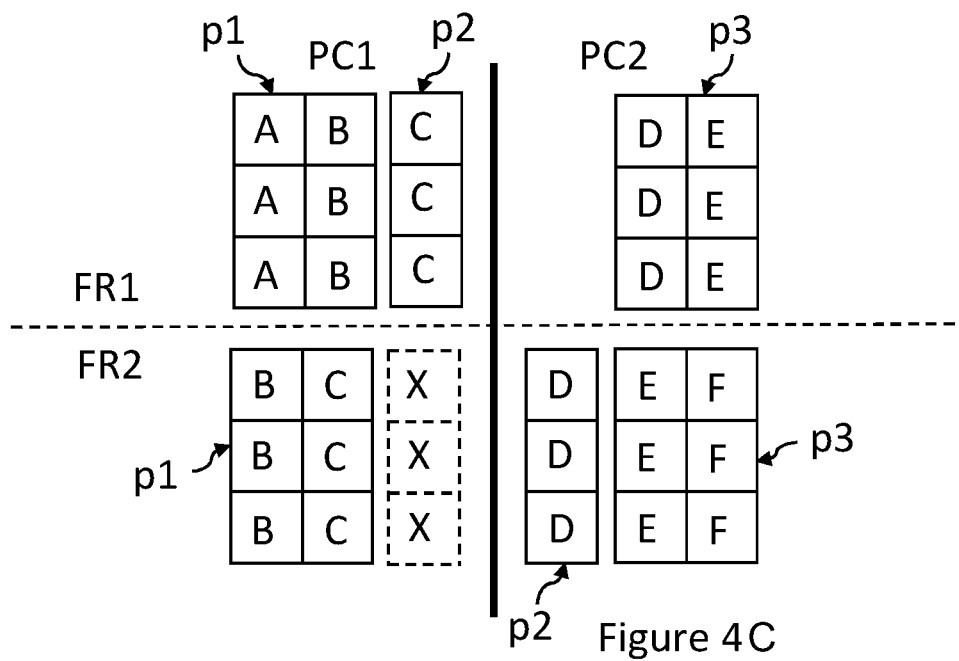

Reference is now made to FIGS. 4A-C which show a second example in relation to horizontal movement to the right of a view area VA across a vertical border BO between a first image portion IP1 and a second image portion IP2 between a previous (first) image frame FR1 and a current (second) image frame FR2 of a plurality of image frames of a video to be encoded. Each image frame FR1, FR2 is illustrated as a grid of pixel blocks which is five pixel blocks high and seven pixel blocks wide. The view area VA is three pixel blocks high and five pixel blocks wide and highlighted with a dashed rectangle. In the second example, the method 200 of the present disclosure is performed in an image processing device as described in respect to the first example with reference to FIGS. 3A-C.

In the method 200, the view area VA of the current image frame FR2 is to be encoded into an encoded video area frame. First, separate portions of the view area VA are identified based on their location in the previous image frame FR1 and the current image frame FR2. Specifically, a first portion p1 of the view area VA is identified that is in the first image portion IP1 in both the previous image frame FR1 and the current image frame FR2. This first portion p1 is the portion of three pixel blocks identified by the letter 'A' and three pixel blocks identified by the letter 'B' within the view area VA in the previous image frame FR1 as illustrated in FIGS. 4A and 4Cc and is the portion of three pixel blocks identified by the letter 'B' and three pixel blocks identified by the letter 'C' within the view area VA in the current image frame FR2 as illustrated in FIGS. 4B and 4C. Furthermore, a second portion p2 of the view area VA is identified that is located in the first image portion IP1 in the previous image frame FR1 and in the second image portion IP2 in the current image frame FR2. This second portion p2 is the portion of three pixel blocks identified by the letter 'C' within the view area VA in the previous image frame FR1 as illustrated in FIGS. 4A and 4C and is the portion of three pixel blocks identified by the letter 'D' within the view area VA in the current image frame FR2 as illustrated in FIGS. 4B and 4B. Furthermore, a third portion p3 of the view area VA is identified that is located in the second image portion IP2 in both the previous image frame FR1 and in the current image frame FR2. This third portion p3 is the portion of three pixel blocks identified by the letter 'D' and three pixel blocks identified by the letter 'E' within the view area VA in the previous image frame FR1 as illustrated in FIGS. 4Aa and 4C and is the portion of three pixel blocks identified by the letter 'E' and three pixel blocks identified by the letter 'F' within the view area VA in the current image frame FR2 as illustrated in FIGS. 4B and 4C. Once the different portions have been identified, the pixel blocks of the portions in the current image frame FR2 can be encoded into respective tiles.

As the first portion p1 of the view area VA is located in the first image portion IP1 in both the previous image frame FR1 and the current image frame FR2, the first encoder arranged in the first processing circuitry PC1 will be used for encoding the first portion p1 of the current image frame FR2, and also, the first reference buffer arranged in the first processing circuitry PC1 will buffer reference image data corresponding to the first portion p1 of the view area VA in the previous image frame FR1. Hence, image data of the first portion p1 of the view area VA in the current image frame FR2 may be inter-coded by the first encoder arranged in the first processing circuitry PC1 as a first encoded tile by referring to reference image data corresponding to the first portion p1 of the view area VA in the previous image frame FR1, which reference image data are buffered in the first reference buffer arranged in the first processing circuitry PC1.

However, as illustrated in FIGS. 4A and 4c, the first image portion IP1 includes both the first portion p1 and the second portion p2 of the view area VA in the previous image frame FR1. Hence, the first reference buffer arranged in the first processing circuitry PC1 will buffer reference image data corresponding to both the first portion p1 and the second portion p2 of the view area VA in the previous image frame FR1. Hence, image data of the first portion p1 of the view area VA in the current image frame FR2 may be inter-coded by the first encoder arranged in the first processing circuitry PC1 as the first encoded tile by referring to reference image data corresponding to both the first portion p1 and the second portion p2 of the view area VA in the previous image frame FR1, i.e., all portions of the view area VA located in the first image portion IP1 in the previous image frame FR1. In order to allow reference to reference image data corresponding to all portions of the view area VA located in the first image portion IP1 in the previous image frame FR1 when inter-coding the first portion p1 of the view area VA in the current image frame FR2, the pixel area to be inter-coded may in some scenarios have to be extended with a ghost portion such that the combination of the first portion p1 of the view area VA in the current image frame FR2 has the same shape as the combination of all portions of the view area VA located in the first image portion IP1 in the previous image frame FR1. Such a ghost portion is illustrated in FIG. 4C by three image blocks having dashed lines and identified by the letter 'X'. In such a case, a ghost portion is created including dummy image data. This ghost portion is an extra portion which is not a real portion of the view area VA in the current frame FR2 but is only used to enable the first encoder to refer to all reference data corresponding to the view area VA in the previous image frame FR1 and buffered in the first reference buffer arranged in the first processing circuitry PC1. The dummy image data can be arbitrarily generated image data. The encoded ghost tile is not merged into the encoded video area frame.

As indicated in relation to the description of the image processing device 100 with reference to FIG. 1, for this first example, where the view area VA moves across the border BO between the first image portion IP1 and the second image portion IP2 such that all portions of the view area VA is either in the first image portion IP1 or in the second image portion IP2 in both the current image frame and the previous image frame, the ghost portion should be configured to have the same shape as the second portion p2 of the view area VA in the previous image frame such that the combination of the first portion p1 and the ghost portion of the current image frame FR2 is the same as the shape of the first portion p1 and the second portion p2 of the previous image frame FR1. The dummy image data of the ghost portion of the view area VA are inter-coded as a ghost encoded tile by referring to reference image data corresponding to both the first portion p1 and the second portion p2 of the view area VA in the previous image frame FR1 buffered in the first reference buffer arranged in the first processing circuitry PC1, i.e., all portions of the view area VA in the first image portion IP1 in the previous image frame FR1.

As the second portion p2 of the view area VA is located in the first image portion IP1 in the previous image frame FR1 and in the second image portion IP2 the current image frame FR2, the second encoder arranged in the second processing circuitry PC2 will be used for encoding the second portion p2 of the current image frame FR2, but the first reference buffer arranged in the first processing circuitry PC1 will buffer reference image data corresponding to the second portion p2 of the view area VA in the previous image frame FR1. Hence, image data of the second portion p2 of the view area VA in the current image frame FR2 need to be intra-coded, by the second encoder arranged in the second processing circuitry PC2, as a second encoded tile (see FIG. 4c).

As the third portion p3 of the view area VA is located in the second image portion IP2 in both the previous image frame FR1 and the current image frame FR2, the second encoder arranged in the second processing circuitry PC2 will be used for encoding the third portion p3 of the current image frame FR2, and also, the second reference buffer arranged in the second processing circuitry PC2 will buffer reference image data corresponding to the third portion p3 of the view area VA in the previous image frame FR1. Hence, image data of the third portion p3 of the view area VA in the current image frame FR2 may be inter-coded by the second encoder arranged in the second processing circuitry PC2 as a third encoded tile by referring to reference image data corresponding to the third portion p3 of the view area VA in the previous image frame FR1, which reference image data are buffered in the second reference buffer arranged in the second processing circuitry PC2 (see FIG. 4C).

The first encoded tile, the second encoded tile, and the third encoded tile are then merged into the encoded video area frame. The first encoder will then decode the encoded image data of the first image portion IP1 of the current image frame and store it as reference image data in the first reference buffer. Correspondingly, the second encoder will decode the encoded image data of the second image portion IP2 of the current image frame FR2 and store it as reference image data in the second reference buffer. The reference image data in the first reference buffer and in the second reference buffer corresponding to the current frame FR2 will then be used as reference image data for a subsequent frame (not shown).

Reference is now made to FIGS. 5A-F which show a third example in relation to diagonal movement downward and to the right of a view area VA across a horizontal border BO1 and a vertical border BO2 between a first image portion IP1, a second image portion IP2, a third image portion IP3, and a fourth image portion IP4 between a previous (first) image frame FR1 and a current (second) image frame FR2 of a plurality of image frames of a video to be encoded. Each image frame FR1, FR2 is illustrated as a grid of pixel blocks which is five pixel blocks high and seven pixel blocks wide. The view area VA is three pixel blocks high and four pixel blocks wide and highlighted with a dashed rectangle. In the third example, the method 200 of the present disclosure is performed in an image processing device, such as the image processing device 100 of the present disclosure. The image processing device comprises a first processing circuitry PC1, a second processing circuitry PC2, a third processing circuitry PC3, and a fourth processing circuitry PC4 configured to process the first image portion IP1, the second image portion IP2, the third image portion IP3, and the fourth image portion IP4, respectively. The processing is typically performed in parallel and with as little exchange of image data as possible between the four circuitries PC1, PC2, PC3, PC4. A first encoder is arranged in the first processing circuitry PC1 and is configured to encode image data of the first image portion IP1 of each image frame of the plurality of image frames, such as the previous image frame FR1 and the current image frame FR2. A second encoder is arranged in the second processing circuitry PC2 configured to encode image data of the second image portion IP2 of each image frame of the plurality of image frames, such as the previous image frame FR1 and the current image frame FR2. A third encoder is arranged in the third processing circuitry PC3 configured to encode image data of the third image portion IP3 of each image frame of the plurality of image frames, such as the previous image frame FR1 and the current image frame FR2. A fourth encoder is arranged in the fourth processing circuitry PC4 configured to encode image data of the fourth image portion IP4 of each image frame of the plurality of image frames, such as the previous image frame FR1 and the current image frame FR2. Furthermore, a first reference buffer arranged in the first processing circuitry PC1, a second reference buffer arranged in the second processing circuitry PC2, a third reference buffer arranged in the third processing circuitry PC3, and a fourth reference buffer arranged in the fourth processing circuitry PC4. The first reference buffer is configured to buffer reference image data in relation to the first image portion IP1, the second reference buffer is configured to buffer reference image data in relation to the second image portion IP2, the third reference buffer is configured to buffer reference image data in relation to the third image portion IP3, the fourth reference buffer is configured to buffer reference image data in relation to the fourth image portion IP4.

Figure 5A:
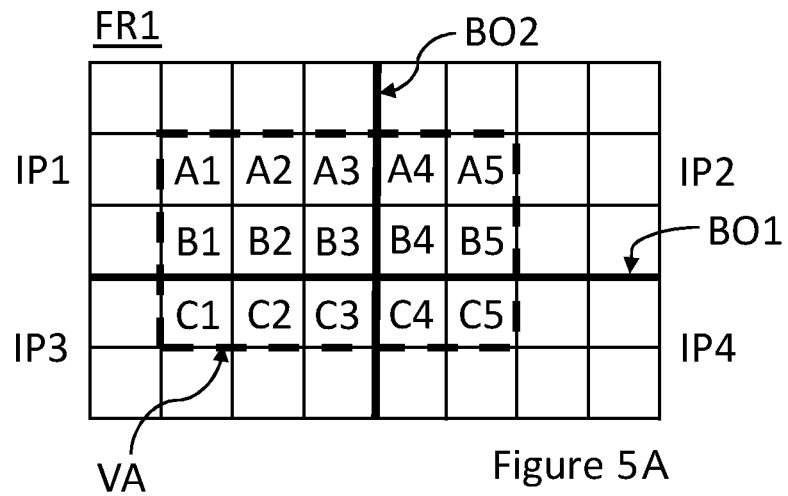
FIGS. 5A-5F show a third example in relation to diagonal movement downward and to the right of a view area across horizontal and vertical borders between a first image portion, a second image portion, a third image portion, and fourth image portion between a previous image frame and a current image frame.
Figure 5B:
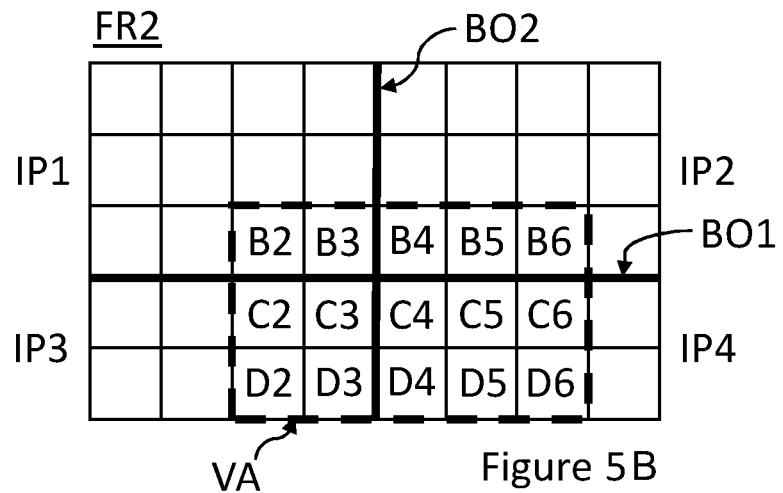
Figure 5C:
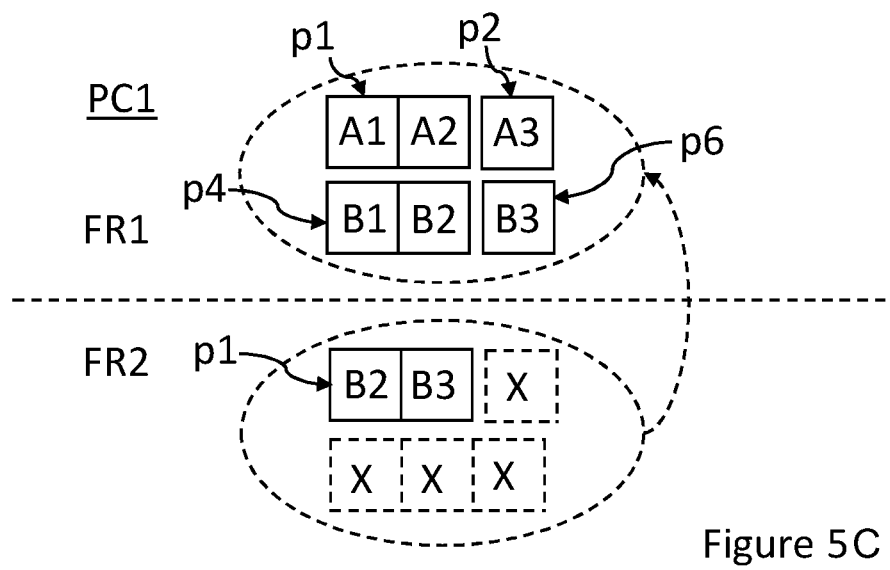
Figure 5D:
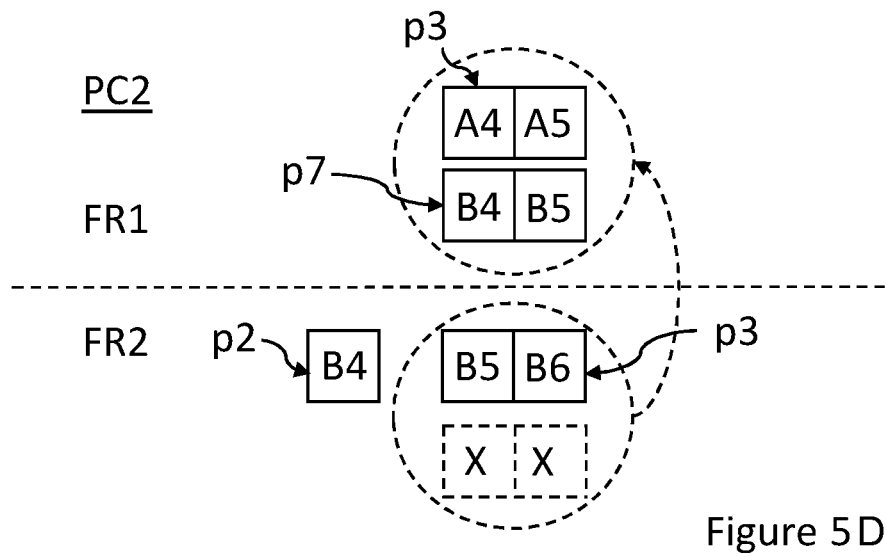

In the method 200, the view area VA of the current image frame FR2 is to be encoded into an encoded video area frame. First, separate portions of the view area VA are identified based on their location in the previous image frame FR1 and the current image frame FR2. Specifically, a first portion p1 of the view area VA is identified that is located in the first image portion IP1 in both the previous image frame FR1 and the current image frame FR2. This first portion p1 is the portion of two pixel blocks identified by 'A1' and 'A2' within the view area VA in the previous image frame FR1 as illustrated in FIGS. 5A and 5C and is the portion of two pixel blocks identified by 'B2' and 'B3' within the view area VA in the current image frame FR2 as illustrated in FIGS. 5B and 5C. Furthermore, a second portion p2 of the view area VA is identified that is located in the first image portion IP1 in the previous image frame FR1 and in the second image portion IP2 in the current image frame FR2. This second portion p2 is the portion of one pixel block identified by 'A3' within the view area VA in the previous image frame FR1 as illustrated in FIGS. 5A and 5C and is the portion of one pixel block identified by 'B4' within the view area VA in the current image frame FR2 as illustrated in FIGS. 5B and 5D. Furthermore, a third portion p3 of the view area VA is identified that is located in the second image portion IP2 in both the previous image frame FR1 and in the current image frame FR2. This third portion p3 is the portion of two pixel blocks identified by 'A4' and 'A5' within the view area VA in the previous image frame FR1 as illustrated in FIGS. 5A and 5D and is the portion of two pixel blocks identified by 'B5' and 'B6' within the view area VA in the current image frame FR2 as illustrated in FIGS. 5B and 5D.

Figure 5E:
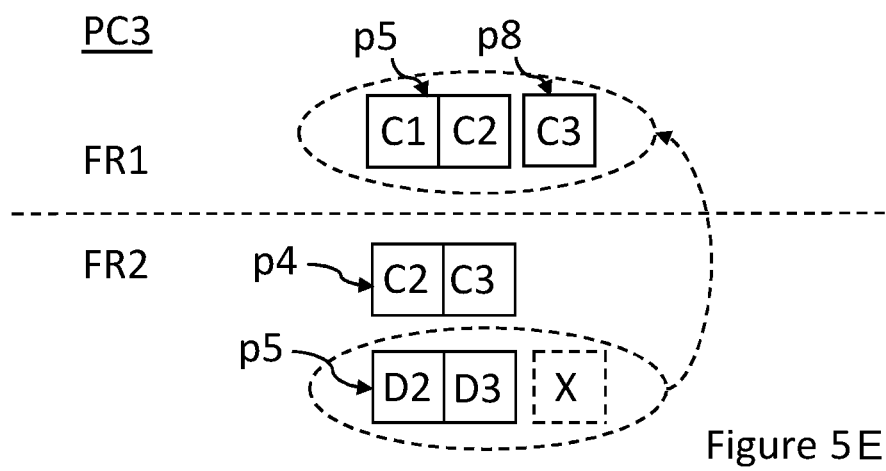

As the third example relates to image frames comprising four image portions IP1, IP2, IP3, IP4, further portions need to be identified in relation to the further two portions IP3, IP4. A fourth portion p4 of the view area VA is identified that is located in the first image portion IP1 in the previous image frame FR1 and in the third image portion IP3 in the current image frame FR2. This fourth portion p4 is the portion of two pixel blocks identified by 'B1' and 'B2' within the view area VA in the previous image frame FR1 as illustrated in FIGS. 5A and 5C and is the portion of two pixel blocks identified by 'C2' and 'C3' within the view area VA in the current image frame FR2 as illustrated in FIGS. 5A and 5E. Furthermore, a fifth portion p5 of the view area VA is identified that is located in the third image portion IP3 in both the previous image frame FR1 and in the current image frame FR2. This fifth portion p5 is the portion of two pixel blocks identified by 'C1' and 'C2' within the view area VA in the previous image frame FR1 as illustrated in FIGS. 5A and 5E and is the portion of two pixel blocks identified by 'D2' and 'D3' within the view area VA in the current image frame FR2 as illustrated in FIGS. 5B and 5E.

Figure 5F:
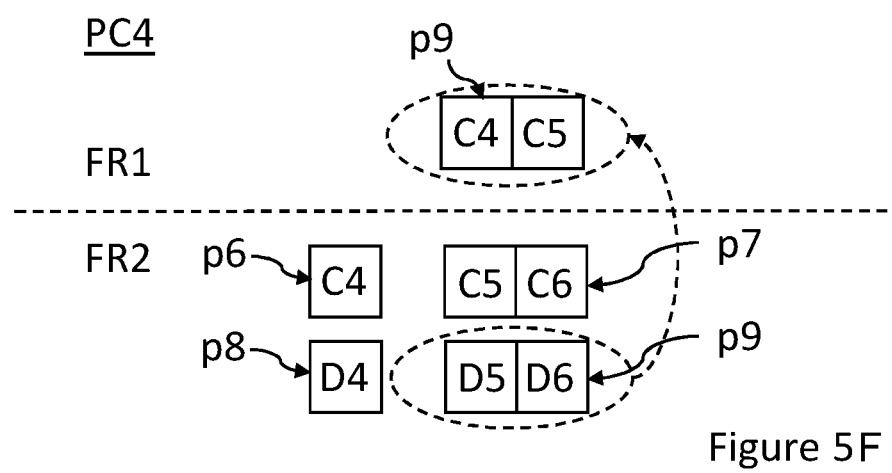

A sixth portion p6 of the view area VA is identified that is located in the first image portion IP1 in the previous image frame FR1 and in the fourth image portion IP4 in the current image frame FR2. This sixth portion p6 is the portion of one pixel block identified by 'B3' within the view area VA in the previous image frame FR1 as illustrated in FIGS. 5A and 5C and is the portion of one pixel block identified by 'C4' within the view area VA in the current image frame FR2 as illustrated in FIGS. 5B and 5F. A seventh portion p7 of the view area VA is identified that is located in the second image portion IP2 in the previous image frame FR1 and in the fourth image portion IP4 in the current image frame FR2. This seventh portion p7 is the portion of two pixel blocks identified by 'B4' and 'B5' within the view area VA in the previous image frame FR1 as illustrated in FIGS. 5A and 5D and is the portion of two pixel blocks identified by 'C5' and 'C6' within the view area VA in the current image frame FR2 as illustrated in FIGS. 5B and 5F. An eighth portion p8 of the view area VA is identified that is located in the third image portion IP3 in the previous image frame FR1 and in the fourth image portion IP4 in the current image frame FR2. This eighth portion p8 is the portion of one pixel block identified by 'C3' within the view area VA in the previous image frame FR1 as illustrated in FIGS. 5A and 5E and is the portion of one pixel block identified by 'D4' within the view area VA in the current image frame FR2 as illustrated in FIGS. 5B and 5F. Furthermore, a ninth portion p9 of the view area VA is identified that is located in the fourth image portion IP4 in both the previous image frame FR1 and in the current image frame FR2. This ninth portion p9 is the portion of two pixel blocks identified by 'C4' and 'C5' within the view area VA in the previous image frame FR1 as illustrated in FIGS. 5A and 5F and is the portion of two pixel blocks identified by 'D5' and 'D6' within the view area VA in the current image frame FR2 as illustrated in FIGS. 5B and 5F.

Once the different portions have been identified, the pixel blocks of the portions in the current image frame FR2 can be encoded into respective slices/tiles.

As the first portion p1 of the view area VA is located in the first image portion IP1 in both the previous image frame FR1 and the current image frame FR2, the first encoder arranged in the first processing circuitry PC1 will be used for encoding the first portion p1 of the current image frame FR2, and also, the first reference buffer arranged in the first processing circuitry PC1 will buffer reference image data corresponding to the first portion p1 of the view area VA in the previous image frame FR1. Hence, image data of the first portion p1 of the view area VA in the current image frame FR2 may be inter-coded by the first encoder arranged in the first processing circuitry PC1 as a first encoded slice/tile by referring to reference image data corresponding to the first portion p1 of the view area VA in the previous image frame FR1, which reference image data are buffered in the first reference buffer arranged in the first processing circuitry PC1.

However, as illustrated in FIGS. 5A and 5C, the first image portion IP1 includes both the first portion p1, the second portion p2, the fourth portion p4, and the sixth portion p6 of the view area VA in the previous image frame FR1. Hence, the first reference buffer arranged in the first processing circuitry PC1 will buffer reference image data corresponding to the first portion p1, the second portion p2, the fourth portion p4, and the sixth portion p6 of the view area VA in the previous image frame FR1. Hence, image data of the first portion p1 of the view area VA in the current image frame FR2 may be inter-coded by the first encoder arranged in the first processing circuitry PC1 as the first encoded slice/tile by referring to reference image data corresponding to the first portion p1, the second portion p2, the fourth portion p4, and the sixth portion p6 of the view area VA in the previous image frame FR1, i.e., all portions of the view area VA located in the first image portion IP1 in the previous image frame FR1. In order to allow reference to reference image data corresponding to all portions of the view area VA located in the first image portion IP1 in the previous image frame FR1 when inter-coding the first portion p1 of the view area VA in the current image frame FR2, the pixel area to be inter-coding may in some scenarios have to be extended with one or more ghost portions such that the combination of the one or more ghost portions and the first portion p1 of the view area VA in the current image frame FR2 has the same shape as the combination of all portions of the view area VA located in the first image portion IP1 in the previous image frame FR1. Such ghost portions are illustrated in FIG. 5C as one ghost portion of three image blocks having dashed lines and identified by the letter 'X' and one ghost portion of one image block having dashed lines and identified by the letter 'X'. The ghost portions are created including dummy image data which can be arbitrarily generated image data. As indicated in relation to the description of the image processing device 100 with reference to FIG. 1, for scenarios where the view area moves across borders between two or more image portions, such as between four image portions comprising a respective processing circuitry for each image portion as in the present third example, this means that the one or more ghost portions should be configured such that the combination of the first portion p1 in the current image frame and the one or more ghost portions has the same shape as all portions of the view area VA located in the first image portion IP1 in the previous image frame. The dummy image data of the ghost portions of the view area VA are inter-coded as a ghost encoded slices/tiles, respectively, by referring to reference image data corresponding to the first portion p1, the second portion p2, the fourth portion p2, and the sixth portion p6 of the view area VA in the previous image frame FR1 buffered in the first reference buffer arranged in the first processing circuitry PC1, i.e., all portions of the view area VA in the first image portion IP1 in the previous image frame FR1.

As the second portion p2 of the view area VA is located in the first image portion IP1 in the previous image frame FR1 and in the second image portion IP2 the current image frame FR2, the second encoder arranged in the second processing circuitry PC2 will be used for encoding the second portion p2 of the current image frame FR2, but the first reference buffer arranged in the first processing circuitry PC1 will buffer reference image data corresponding to the second portion p2 of the view area VA in the previous image frame FR1. Hence, image data of the second portion p2 of the view area VA in the current image frame FR2 need to be intra-coded, by the second encoder arranged in the second processing circuitry PC2, as a second encoded slice/tile (see FIGS. 5A and 5D).

As the third portion p3 of the view area VA is located in the second image portion IP2 in both the previous image frame FR1 and the current image frame FR2, the second encoder arranged in the second processing circuitry PC2 will be used for encoding the third portion p3 of the current image frame FR2, and also, the second reference buffer arranged in the second processing circuitry PC2 will buffer reference image data corresponding to the third portion p3 of the view area VA in the previous image frame FR1. Hence, image data of the third portion p3 of the view area VA in the current image frame FR2 may be inter-coded by the second encoder arranged in the second processing circuitry PC2 as a third encoded slice/tile by referring to reference image data corresponding to the third portion p3 of the view area VA in the previous image frame FR1, which reference image data are buffered in the second reference buffer arranged in the second processing circuitry PC2.

However, as illustrated in FIGS. 5A and 5D, the second image portion IP2 includes both the third portion p3, and the seventh portion p7 of the view area VA in the previous image frame FR1. Hence, the second reference buffer arranged in the second processing circuitry PC2 will buffer reference image data corresponding to the third portion p3, and the seventh portion p7 of the view area VA in the previous image frame FR1. Hence, image data of the third portion p3 of the view area VA in the current image frame FR2 may be inter-coded by the second encoder arranged in the second processing circuitry PC2 as the third encoded slice/tile by referring to reference image data corresponding to the third portion p3, and the seventh portion p7 of the view area VA in the previous image frame FR1, i.e., all portions of the view area VA located in the second image portion IP2 in the previous image frame FR1. In order to allow reference to reference image data corresponding to all portions of the view area VA located in the first image portion IP1 in the previous image frame FR1 when inter-coding the third portion p3 of the view area VA in the current image frame FR2, the pixel area to be inter-coded may in some scenarios have to be extended with one or more ghost portions such that the combination of the one or more ghost portions and the third portion p3 of the view area VA in the current image frame FR2 has the same shape as the combination of all portions of the view area VA located in the second image portion IP2 in the previous image frame FR1. Such a ghost portion is illustrated in FIG. 5D as one ghost portion of two image blocks having dashed lines and identified by the letter 'X'. The ghost portion is created including dummy image data which can be arbitrarily generated image data. The dummy image data of the ghost portion of the view area VA is inter-coded as a ghost encoded slice/tile, by referring to reference image data corresponding to the third portion p3, and the seventh portion p7 of the view area VA in the previous image frame FR1 buffered in the second reference buffer arranged in the second processing circuitry PC2, i.e., all portions of the view area VA in the second image portion IP2 in the previous image frame FR1.

As the fourth portion p4 of the view area VA is located in the first image portion IP1 in the previous image frame FR1 and in the third image portion IP3 the current image frame FR2, the third encoder arranged in the third processing circuitry PC3 will be used for encoding the fourth portion p4 of the current image frame FR2, but the first reference buffer arranged in the first processing circuitry PC1 will buffer reference image data corresponding to the fourth portion p4 of the view area VA in the previous image frame FR1. Hence, image data of the fourth portion p4 of the view area VA in the current image frame FR2 need to be intra-coded, by the third encoder arranged in the third processing circuitry PC3, as a fourth encoded slice/tile (see FIGS. 5A and 5E).

As the fifth portion p5 of the view area VA is located in the third image portion IP3 in both the previous image frame FR1 and the current image frame FR2, the third encoder arranged in the third processing circuitry PC3 will be used for encoding the fifth portion p5 of the current image frame FR2, and also, the third reference buffer arranged in the third processing circuitry PC3 will buffer reference image data corresponding to the fifth portion p5 of the view area VA in the previous image frame FR1. Hence, image data of the fifth portion p5 of the view area VA in the current image frame FR2 may be inter-coded by the third encoder arranged in the third processing circuitry PC3 as a fifth encoded slice/tile by referring to reference image data corresponding to the fifth portion p5 of the view area VA in the previous image frame FR1, which reference image data are buffered in the third reference buffer arranged in the third processing circuitry PC3.

However, as illustrated in FIGS. 5A and 5E, the third image portion IP3 includes both the fifth portion p5, and the eighth portion p8 of the view area VA in the previous image frame FR1. Hence, the third reference buffer arranged in the third processing circuitry PC3 will buffer reference image data corresponding to the fifth portion p5, and the eighth portion p8 of the view area VA in the previous image frame FR1. Hence, image data of the fifth portion p5 of the view area VA in the current image frame FR2 may be inter-coded by the third encoder arranged in the third processing circuitry PC3 as the fifth encoded slice/tile by referring to reference image data corresponding to the fifth portion p5, and the eighth portion p8 of the view area VA in the previous image frame FR1, i.e., all portions of the view area VA located in the third image portion IP3 in the previous image frame FR1. In order to allow reference to reference image data corresponding to all portions of the view area VA located in the third image portion IP3 in the previous image frame FR1 when inter-coding the fifth portion p5 of the view area VA in the current image frame FR2, the pixel area to be inter-coding may in some scenarios have to be extended with one or more ghost portions such that the combination of the ghost portion and the fifth portion p5 of the view area VA in the current image frame FR2 has the same shape as the combination of all portions of the view area VA located in the third image portion IP3 in the previous image frame FR1, i.e., the fifth portion p5, and the eighth portion p8 of the view area VA in the previous image frame FR1. Such a ghost portion is illustrated in FIG. 5E as a ghost portion of one image block having dashed lines and identified by the letter 'X'. The ghost portion is created including dummy image data which can be arbitrarily generated image data. The dummy image data of the ghost portion of the view area VA is inter-coded as a ghost encoded slice/tile, by referring to reference image data corresponding to the fifth portion p5, and the eighth portion p8 of the view area VA in the previous image frame FR1 buffered in the third reference buffer arranged in the third processing circuitry PC3, i.e., all portions of the view area VA in the third image portion IP3 in the previous image frame FR1.

As the sixth portion p6 of the view area VA is located in the first image portion IP1 in the previous image frame FR1 and in the fourth image portion IP4 the current image frame FR2, the fourth encoder arranged in the fourth processing circuitry PC4 will be used for encoding the sixth portion p6 of the current image frame FR2, but the first reference buffer arranged in the first processing circuitry PC1 will buffer reference image data corresponding to the sixth portion p6 of the view area VA in the previous image frame FR1. Hence, image data of the sixth portion p6 of the view area VA in the current image frame FR2 need to be intra-coded, by the fourth encoder arranged in the fourth processing circuitry PC4, as a sixth encoded slice/tile (see FIGS. 5A and 5F).

As the seventh portion p7 of the view area VA is located in the second image portion IP2 in the previous image frame FR1 and in the fourth image portion IP4 the current image frame FR2, the fourth encoder arranged in the fourth processing circuitry PC4 will be used for encoding the seventh portion p7 of the current image frame FR2, but the second reference buffer arranged in the second processing circuitry PC2 will buffer reference image data corresponding to the seventh portion p7 of the view area VA in the previous image frame FR1. Hence, image data of the seventh portion p7 of the view area VA in the current image frame FR2 need to be intra-coded, by the fourth encoder arranged in the fourth processing circuitry PC4, as a seventh encoded slice/tile (see FIGS. 5A and 5F).

As the eighth portion p8 of the view area VA is located in the third image portion IP3 in the previous image frame FR1 and in the fourth image portion IP4 the current image frame FR2, the fourth encoder arranged in the fourth processing circuitry PC4 will be used for encoding the eighth portion p8 of the current image frame FR2, but the third reference buffer arranged in the third processing circuitry PC3 will buffer reference image data corresponding to the eighth portion p8 of the view area VA in the previous image frame FR1. Hence, image data of the eighth portion p8 of the view area VA in the current image frame FR2 need to be intra-coded, by the fourth encoder arranged in the fourth processing circuitry PC4, as an eighth encoded slice/tile (see FIGS. 5A and 5F).

As the ninth portion p9 of the view area VA is located in the fourth image portion IP4 in both the previous image frame FR1 and the current image frame FR2, the fourth encoder arranged in the fourth processing circuitry PC4 will be used for encoding the ninth portion p9 of the current image frame FR2, and also, the fourth reference buffer arranged in the fourth processing circuitry PC4 will buffer reference image data corresponding to the ninth portion p9 of the view area VA in the previous image frame FR1. Hence, image data of the ninth portion p9 of the view area VA in the current image frame FR2 may be inter-coded by the fourth encoder arranged in the fourth processing circuitry PC4 as a ninth encoded slice/tile by referring to reference image data corresponding to the ninth portion p9 of the view area VA in the previous image frame FR1, which reference image data are buffered in the fourth reference buffer arranged in the fourth processing circuitry PC4 (see FIGS. 5A and 5F).

The first encoded slice/tile, the second encoded slice/tile, the third encoded slice/tile, the fourth encoded slice/tile, the fifth encoded slice/tile, the sixth encoded slice/tile, the seventh encoded slice/tile, the eighth encoded slice/tile, and the ninth encoded slice/tile are then merged into the encoded video area frame. The first encoder will then decode the encoded image data of the first image portion IP1 of the current image frame and store it as reference image data in the first reference buffer. Correspondingly, the second, third and fourth encoders will decode the encoded image data of the second, third and fourth image portions IP2, IP3, IP4 of the current image frame FR2 and store it as reference image data in the second, third and fourth reference buffers, respectively. The reference image data in the first, second, third and fourth reference buffers corresponding to the current frame FR2 will then be used as reference image data for a subsequent frame (not shown).

The person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for encoding a view area within a current image frame of a video comprising a plurality of image frames into an encoded video area frame, wherein the view area is a respective subarea of each image frame of the plurality of image frames, wherein each image frame of the plurality of image frames comprises a first image portion and a second image portion, wherein, between a previous image frame of the video and the current image frame of the video, the view area moves across a boundary between the first image portion and the second image portion, wherein a first encoder arranged in a first processing circuitry is configured to encode image data of the first image portion of each image frame of the plurality of image frames and a second encoder arranged in a second processing circuitry is configured to encode image data of the second image portion of each image frame of the plurality of image frames, the method comprising:
identifying a first portion of the view area that is located in the first image portion in both the previous image frame and the current image frame,
identifying a second portion of the view area that is located in the first image portion in the previous image frame and in the second image portion in the current image frame,
identifying a third portion of the view area that is located in the second image portion in both the previous image frame and the current image frame,
inter-coding, by the first encoder, image data of the first portion of the view area in the current image frame as a first encoded slice/tile by referring to reference image data corresponding to the previous image frame buffered in a first reference buffer arranged in the first processing circuitry,
intra-coding, by the second encoder, all image data of the second portion of the view area in the current image frame as a second encoded slice/tile and refraining from inter-coding of any image data of the second portion of the view area in the current image frame,
inter-coding, by the second encoder, image data of the third portion of the view area in the current image frame as a third encoded slice/tile by referring to reference image data corresponding to the previous image frame buffered in a second reference buffer arranged in the second processing circuitry, and
merging the first encoded slice/tile, the second encoded slice/tile, and the third encoded slice/tile into the encoded video area frame.

2. The method according to claim 1, wherein, in the act of inter-coding, by the first encoder, the image data of the first portion of the view area in the current image frame are inter-coded as the first encoded slice/tile by referring to reference image data corresponding to the first portion of the view area in the previous image frame buffered in the first reference buffer, and wherein, in the act of inter-coding, by the second encoder, the image data of the third portion of the view area in the current image frame are inter-coded as the third encoded slice/tile by referring to reference image data corresponding to the third portion of the view area in the previous image frame buffered in the second reference buffer.

3. The method according to claim 1, wherein, in the act of inter-coding, by the first encoder, the image data of the first portion of the view area in the current image frame are inter-coded as the first encoded slice/tile by referring to reference image data corresponding to the view area in the previous image frame buffered in the first reference buffer, and wherein, in the act of inter-coding, by the second encoder, the image data of the third portion of the view area in the current image frame are inter-coded as the third encoded slice/tile by referring to reference image data corresponding to the view area in the previous image frame buffered in the second reference buffer.

4. The method according to claim 3, further comprising:
inter-coding, by the first encoder, dummy image data of a ghost portion of the view area as a ghost encoded slice/tile by referring to reference image data corresponding to the view area in the previous image frame buffered in the first reference buffer, wherein the ghost portion is an extra portion configured to have a shape such that the combination of the first portion and the ghost portion of the current image frame has the same shape as the reference image data in the first reference buffer, and wherein the ghost slice/tile is a slice/tile that is not merged into the encoded view area frame but is only encoded in order to enable an encoder to refer to all reference data corresponding to the view area in in the previous image frame buffered in the first reference buffer.

5. The method according to claim 1, wherein the first image portion is captured by a first image sensor and wherein the second image portion is captured by a second image sensor.

6. A non-transitory computer-readable storage medium having stored thereon instructions, when executed by a device having processing capabilities, for implementing a method for encoding a view area within a current image frame of a video comprising a plurality of image frames into an encoded video area frame, wherein the view area is a respective subarea of each image frame of the plurality of image frames, wherein each image frame of the plurality of image frames comprises a first image portion and a second image portion, wherein, between a previous image frame of the video and the current image frame of the video, the view area moves across a boundary between the first image portion and the second image portion, wherein a first encoder arranged in a first processing circuitry is configured to encode image data of the first image portion of each image frame of the plurality of image frames and a second encoder arranged in a second processing circuitry is configured to encode image data of the second image portion of each image frame of the plurality of image frames, the method comprising:
identifying a first portion of the view area that is located in the first image portion in both the previous image frame and the current image frame,
identifying a second portion of the view area that is located in the first image portion in the previous image frame and in the second image portion in the current image frame,
identifying a third portion of the view area that is located in the second image portion in both the previous image frame and the current image frame,
inter-coding, by the first encoder, image data of the first portion of the view area in the current image frame as a first encoded slice/tile by referring to reference image data corresponding to the previous image frame buffered in a first reference buffer arranged in the first processing circuitry, intra-coding, by the second encoder, all image data of the second portion of the view area in the current image frame as a second encoded slice/tile and refraining from inter-coding of any image data of the second portion of the view area in the current image frame, inter-coding, by the second encoder, image data of the third portion of the view area in the current image frame as a third encoded slice/tile by referring to reference image data corresponding to the previous image frame buffered in a second reference buffer arranged in the second processing circuitry, and merging the first encoded slice/tile, the second encoded slice/tile, and the third encoded slice/tile into the encoded video area frame.

7. An image processing device for encoding a view area within a current image frame of a video comprising a plurality of image frames into an encoded video area frame, wherein the view area is a respective subarea of each image frame of the plurality of image frames, wherein each image frame of the plurality of image frames comprises a first image portion and a second image portion, wherein, between a previous image frame of the video and the current image frame of the video, the view area moves across a boundary between the first image portion and the second image portion, the device comprising:

a first processing circuitry;

a second processing circuitry;

a first encoder arranged in the first processing circuitry configured to encode image data of the first image portion of each image frame of the plurality of image frames;

a second encoder arranged in the second processing circuitry configured to encode image data of the second image portion of each image frame of the plurality of image frames;

a first reference buffer arranged in the first processing circuitry;

a second reference buffer arranged in the second processing circuitry; and device circuitry configured to execute:

a first identifying function configured to identify a first portion of the view area that is located in the first image portion in both the previous image frame and the current image frame, a second identifying function configured to identify a second portion of the view area that is located in the first image portion in the previous image frame and in the second image portion in the current image frame, a third identifying function configured to identify a third portion of the view area that is located in the second image portion in both the previous image frame and the current image frame, a first inter-coding instructing function configured to instruct the first encoder to inter-code image data of the first portion of the view area in the current image frame as a first encoded slice/tile by referring to reference image data corresponding to the previous image frame buffered in the first reference buffer, an intra-coding instructing function configured to instruct the second encoder to intra-code all image data of the second portion of the view area in the current image frame as a second encoded slice/tile and refrain from inter-coding of any image data of the second portion of the view area in the current image frame, a second inter-coding instructing function configured to instruct the second encoder to inter-code image data of the third portion of the view area in the current image frame as a third encoded slice/tile by referring to reference image data corresponding to the previous image frame buffered in the second reference buffer, and a merging function configured to merge the first encoded slice/tile, the second encoded slice/tile, and the third encoded slice/tile into the encoded view area frame.

8. The image processing device according to claim 7, wherein the first inter-coding instructing function is configured to instruct the first encoder to inter encode the image data of the first portion of the view area in the current image frame as the first encoded slice/tile by referring to reference image data corresponding to the first portion of the view area in the previous image frame buffered in the first reference buffer, and wherein, the second inter-coding instructing function is configured to instruct the second encoder to inter-code the image data of the third portion of the view area in the current image frame as the third encoded slice/tile by referring to reference image data corresponding to the third portion of the view area in the previous image frame buffered in the second reference buffer.

9. The image processing device according to claim 7, wherein the first inter-coding instructing function is configured to instruct the first encoder to inter-code the image data of the first portion of the view area in the current image frame as the first encoded slice/tile by referring to reference image data corresponding to the view area in the previous image frame buffered in the first reference buffer, and wherein the second inter-coding instructing function is configured to instruct the second encoder to inter-code the image data of the third portion of the view area in the current image frame as the third encoded slice/tile by referring to reference image data corresponding to the view area in the previous image frame buffered in the second reference buffer.

10. The image processing device according to claim 9, wherein the device circuitry is further configured to execute:

a third inter-coding instructing function configured instruct the first encoder to inter-code dummy image data of a ghost portion of the view area as a ghost encoded slice/tile by referring to reference image data corresponding to the view area in the previous image frame buffered in the first reference buffer, wherein the ghost portion is an extra portion configured to have a shape such that the combination of the first portion and the ghost portion of the current image frame has the same shape as the reference image data in the first reference buffer, and wherein the ghost slice/tile is a slice/tile that is not merged into the encoded view area frame but is only encoded in order to enable an encoder to refer to all reference data corresponding to the view area in in the previous image frame buffered in the first reference buffer.

11. The image processing device according to claim 7, further comprising:

a first image sensor for capturing the first image portion; and a second image sensor for capturing the second image portion.

* * * * *